(12) United States Patent  
Allen et al.

(10) Patent No.: US 9,047,488 B2  
(45) Date of Patent: Jun. 2, 2015

(54) ANONYMIZING SENSITIVE IDENTIFYING INFORMATION BASED ON RELATIONAL CONTEXT ACROSS A GROUP

(71) Applicant: International Business Machines Corporation, Armonk, NY (US)

(72) Inventors: Corville O. Allen, Morrisville, NC (US); Scott R. Carrier, Apex, NC (US); Harold Moss, III, Danvers, MA (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/842,585

(22) Filed: Mar. 15, 2013

(65) Prior Publication Data

US 2014/0283097 A1    Sep. 18, 2014

(51) Int. Cl.
*G06F 17/30*    (2006.01)
*G06F 21/62*    (2013.01)

(52) U.S. Cl.
CPC .................................. *G06F 21/6254* (2013.01)

(58) Field of Classification Search
None
See application file for complete search history.

(56) References Cited

U.S. PATENT DOCUMENTS

| 7,669,051 B2 | 2/2010 | Redlich et al. |
| 8,256,006 B2 | 8/2012 | Grzymala-Busse et al. |
| 2008/0228797 A1* | 9/2008 | Kenedy et al. ................ 707/101 |
| 2009/0303237 A1 | 12/2009 | Liu et al. |
| 2009/0328226 A1* | 12/2009 | Bradford .......................... 726/26 |
| 2011/0040983 A1 | 2/2011 | Grzymala-Busse et al. |
| 2011/0113049 A1 | 5/2011 | Davis et al. |
| 2011/0277037 A1 | 11/2011 | Burke et al. |
| 2012/0303616 A1 | 11/2012 | Abuelsaad et al. |
| 2013/0138698 A1* | 5/2013 | Harada et al. ................. 707/797 |

OTHER PUBLICATIONS

"IBM Journal of Research and Development", IBM Corporation, vol. 56, No. 3/4, May/Jul. 2012, 208 pages.
"Machine Learning: Working out the Cost Function", fnenu's Notes on Online Courses, http://fnenuonlinecourses.blogspot.com/2011/10/machine-learningworking-out-cost.html, Oct. 11, 2011, 3 pages.
"Mechanism for identifying and removing unwanted sensitive information from online communication", ip.com, IPCOM000219137D, Jun. 21, 2012, 2 pages.

(Continued)

*Primary Examiner* — Fatoumata Traore
(74) *Attorney, Agent, or Firm* — Stephen J. Walder, Jr.; Jeffrey S. LaBaw

(57) ABSTRACT

Mechanisms are provided for relational context sensitive anonymization of data. A request for data is received that specifies a relational context corresponding to a selected group of selected persons selected from a global group of persons based on the relational context. The relational context specifies one or more attributes of selected persons in the selected group that establishes a relationship between the selected persons and distinguishes the selected persons from non-selected persons in the global group that are not in the selected group. For the relational context, based on a corpus of personal information data corresponding to the selected persons, key attributes in the personal information data are determined and a rarity value for each key attribute is determined. Selected key attributes are then anonymized based on the determined rarity value for each of the key attributes within the relational context of the selected group.

25 Claims, 7 Drawing Sheets

(56) References Cited

OTHER PUBLICATIONS

Conway, Ted, "Secure method and system for identifying, confirming, and/or selecting accounts without exposing sensitive account information", ip.com, IPCOM000009154D, Aug. 9, 2002, 6 pages.

Dampney, C.N.G., "Specifying a Semantically Adequate Structure for Information Systems and Databases", ip.com, IPCOM000161232D, electronic publication: Dec. 9, 2007, original publication: Apr. 30, 1987, 27 pages.

* cited by examiner

ANONYMIZING SENSITIVE IDENTIFYING INFORMATION BASED ON RELATIONAL CONTEXT ACROSS A GROUP

BACKGROUND

The present application relates generally to an improved data processing apparatus and method and more specifically to mechanisms for identifying and anonymizing sensitive identifying information based on a relational context across a group of individuals.

Anonymization of data is an important consideration in today's computer oriented society where individual privacy may be relatively easily circumvented using computerized mechanisms. That is, through websites, databases, directories, and the like, personal information for individuals is collected and made accessible for legitimate uses, but can also be exploited for illegitimate uses. The individuals privacy is becoming a more important issue as identity theft and other illegal accesses to personal information becomes more rampant. Furthermore, governmental regulations require that certain types of data about individuals, such as medical history information, be kept secure.

Known anonymization systems and techniques essentially utilize a pattern matching or keyword search to identify standardized pieces of information to obfuscate or eliminate from being able to be returned as results of a query. In more structured systems, a type of field basis may be used for identifying fields containing personally identifiable information. In general, these systems identify fields in data, such as names, addresses, zip codes, etc., that are determined to be fields that may be used to individually identify a particular person, and programmatically obfuscate or eliminate these fields from being able to be returned as results of a query.

Examples of anonymization systems and techniques may be found in the following commonly owned U.S. Patent Application Publications: 2009/0303237; 2011/0113049; 2011/0277037; and 2012/0303616.

SUMMARY

In one illustrative embodiment, a method, in a data processing system comprising a processor and a memory, for relational context sensitive anonymization of data is provided. The method comprises receiving, by the data processing system, a request for data. The request specifies a relational context corresponding to a selected group of selected persons selected from a global group of persons based on the relational context. The relational context specifies one or more attributes of selected persons in the selected group that establishes a relationship between the selected persons and distinguishes the selected persons from non-selected persons in the global group that are not in the selected group. The method further comprises determining, by the data processing system, for the relational context corresponding to the selected group, based a corpus of personal information data corresponding to the selected persons in the selected group, one or more key attributes in the personal information data. Moreover, the method comprises determining, by the data processing system, a rarity value for each key attribute of the one or more key attributes within the relational context of the selected group. In addition, the method comprises anonymizing, by the data processing system, selected key attributes in the one or more key attributes based on the determined rarity value for each of the key attributes within the relational context of the selected group.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
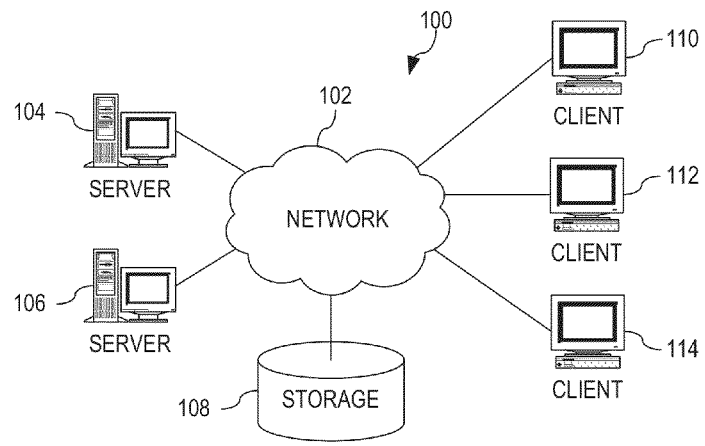
FIG. 1 is an example diagram of a distributed data processing system in which aspects of the illustrative embodiments may be implemented.

As mentioned above, anonymization systems have been developed for removing or obfuscating personally identifiable information (PII) based on predefined fields, keywords, and pattern matching. While such anonymization techniques may work well when the anonymization is applied across a large undefined general collection of individuals, these anonymization systems may not completely anonymize the data when the data is associated with a well defined group. That is, the typical information that is removed or obfuscated may still leave other information that, in a general undefined collection of individuals may not be personally identifiable, but within the context of a well defined group, may be personally identifiable. In other words, a problem exists where, within the context of related data, the information for an individual can stand out against that group, which in effect identifies that individual within the group. Thus, the known anonymization mechanisms are not able to anonymize data of a group of individuals defined around a related context.

As an example to further illustrate this deficiency in the known anonymization mechanisms, consider a group of 20 people that are participating in a cancer treatment program. A computing system, such as a database query system, question and answer system, e.g., the Watson™ question and answer system available from International Business Machines Corporation of Armonk, N.Y., or the like, may receive data for these 20 people regarding the personal information, demographics, as well as information about the medical conditions including a certain stage and type of cancer of the individuals. Within these 20 people, a few of them may be marked by a rare type of effect in their medical history that maps to a cancer type and treatment options.

Known anonymization systems and techniques may anonymize the names, addresss, social security numbers, and other general non-context sensitive personally identifiable information from the data that is retrieved and presented by the computing system. However, the rare type of effect in certain ones of these individuals' medical histories may not be anonymized because this information, in general, is not considered personally identifiable information. But, within the context of this well defined group of cancer treatment program participants, the rare type of effect, possibly in combination with other information that is not anonymized, may uniquely identify the individual within the context of the well defined group.

The illustrative embodiments herein provide mechanisms for identifying and anonymizing sensitive personally identifiable information based on a relational context across a well defined group of individuals, i.e. a set of one or more common attributes of the individuals within the well defined group that establish a relationship between the individuals within the well defined group and distinguish the individuals from other individuals that are not within the well defined group. With the mechanisms of the illustrative embodiments, given a set of data associated with a specified relational context, key attributes within the data are identified and a rarity value is associated with these key attributes. A combinatorial rarity matrix is generated for the key attributes and probabilities of matching particular combinations of the key attributes are determined based on the combinatorial rarity matrix. It should be noted that combinatorial matrix theory focuses on analyzing patterns of entries in a matrix rather than the values of the entries themselves and thus, this theory is being used to identify patterns in the combinatorial rarity matrix and their probability of occurring. Based on the combinatorial rarity matrix, the terms, sets of related terms, etc., that are most likely to be rare within the specified relational context, and thus, personally indicative of individuals within the well defined group, are identified and appropriate anonymization operations are performed to anonymize the identified rare terms, set of related terms, or the like.

In building the combinatorial rarity matrix, a relative rarity matrix engine may utilize the deep semantic relationship of data. The term "deep semantic relationship" is defined as the relationship between entities in a given relational context and how they relate to each other. In one illustrative embodiment, these deep semantic relationships may be defined in terms of a tuple of words/terms/entities or an occurrence with a relationship of those entities, e.g., a triplet of words/terms/entities. For example, (Mutation, Cancer, Organ) would be a deep semantic relationship identifying that mutations, cancer, and specific organ ontologies have a deep relationship. Further, in one illustrative embodiment, a specific relationship, such as (mass, ?indicates, metastasis) may be provided, where the combination and synonyms for "indicates" would mean some of the cancer has metastasize.

Moreover, the term "deep semantic relationship", in some illustrative embodiments means the relationship of terms in a specific ontology and their similarity, when expressed in documents or other collections of text, based on how they are typically expressed using sequence matching algorithms for text analysis. For example, the Smith-Waterman sequence-matching algorithm measures the lengths of the longest similar subsequence between two texts. Thus, in some illustrative embodiments, the deep semantic relationships are identified by using text analysis techniques to define relationships between entities, terms and how those terms relate; storing them in tuples, such as the triplet (A,B,C), or loose maps to be used later on, where A can be an entity, B a stated relation, and C another entity. Additionally, in some illustrative embodiments, A, B and C are all entities with an implied relationship in an ontology or context. More information regarding deep semantic relationship analysis and the generation of such relationships may be found in the IBM Journal of Research and Development, 2012, Volume 56, Issue 3.4, which is hereby incorporated in its entirety by reference.

Deep semantic relationships that are uncommon across a relational context of data, e.g., oncology, are identified in a training set of data in order to build a machine learning model of the rarest data sets for a given relational context. The rarest data set is the seed for the combinatorial rarity matrix that is used to identify the set(s) of attributes associated with the relational context of data that are most likely to be personally identifiable of an individual within the relational context.

With the combinatorial rarity matrix having been generated, and the set of attributes around the context having been defined, an acceptable probability level is defined at which one would need to anonymize the corresponding set of attributes so that the data is not personally identifiable of an individual person or accessible/readable by unauthorized individuals. Thus, combinations of attributes are identified that have a probability of occurring that is equal to or less than the established acceptable probability level, and therefore are likely to be indicative of an individual person within the relational context of the well defined group. These combinations of attributes may then be anonymized, in addition to the generic anonymizations performed on name, address, social security number, demographic information, and the like.

The anonymization of data performed by the mechanisms of the illustrative embodiments maintains the context of the original data elements in the non-anonymized data but eliminates the personally identifiable nature of the data elements. That is the data elements may be replaced with alternative data elements that are equivalent but would not be personally identifiable within the relational context of the well defined group. As an example, if a personally identifiable term is a particular drug name that a patient within a group of patients is presently taking, then the drug name may be replaced with a different drug name that is more generic and less likely to be personally identifiable of the patient. As another example, a patient's name may be replaced with an equivalent name maintaining the context of the patient's gender, i.e. female names are replaced with similar female names and male names are replaced with similar male names. The anonymization may be performed using context analysis and established generalization tables specifying generalizations for particular categories of data elements, as described in greater detail hereafter.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
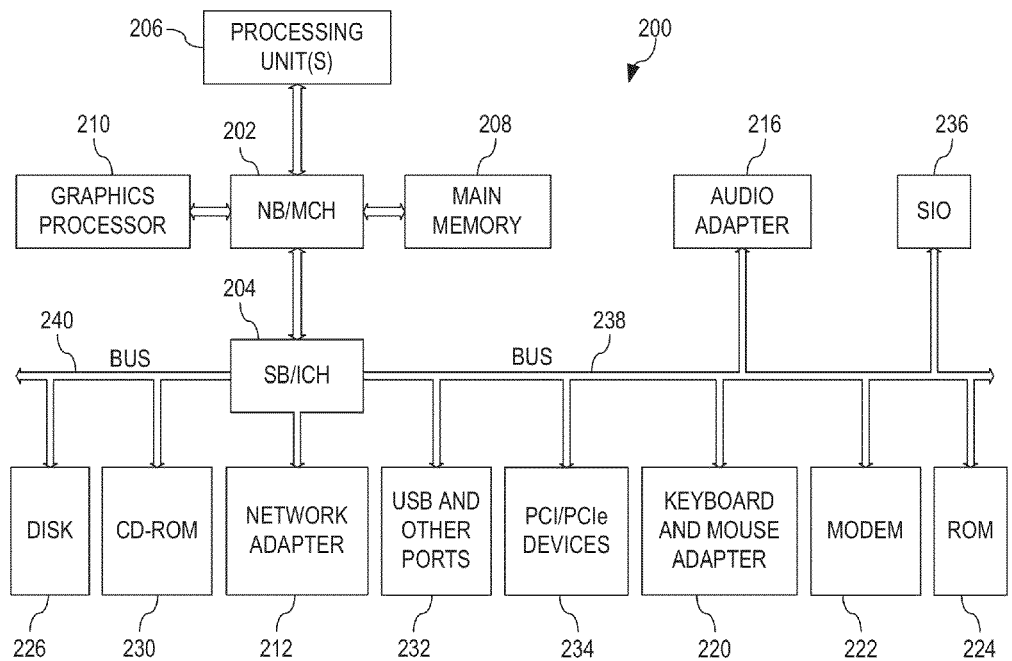
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Turning again to FIG. 1, one or more of the server computing devices 104, 106 may execute code and/or contain hardware logic, to implement a data anonymization mechanism in accordance with the illustrative embodiments. The data anonymization mechanism may work in conjunction with other code and/or hardware logic of the server 104, 106 or other computing devices to provide data to this other code and/or hardware logic for processing, presentation, or the like. As such, the mechanisms of the illustrative embodiments anonymize the data before providing the data to these other portions of code and/or hardware logic so that the data cannot be used to personally identify an individual within a given context of a well defined group of individuals. The types of code and/or hardware logic with which the anonymization mechanisms of the illustrative embodiments may be utilized is wide spread and may include, for example, medical systems, governmental systems, human resources systems of various organizations, legal systems, or any other system in which personal information of individuals is collected and may be retrieved for processing and/or presentation and in which the privacy of individuals represented by the personal information is important to be protected or even mandated by law.

The mechanisms of the illustrative embodiments may be utilized with, or integrated in, existing anonymization systems, tools, or the like, to augment the abilities of these existing anonymization systems, tools, etc. to be able to anonymize data taking into account the context of the well defined groups of the individuals whose data is being anonymized. Thus, the mechanisms of the illustrative embodiment may be implemented alone as a separate system or may be integrated with existing systems and used to improve these existing systems.

The term "well defined" group refers to a group of individuals (persons), that is a subset of a larger general group of individuals (persons), which have at least one common attribute that defines a relational context, i.e. a relationship between the individuals within the "well defined" group, and which distinguishes the individuals in the "well defined" group from individuals in the larger general group that are not part of the "well defined" group. In some illustrative embodiments, the "well defined" group common attribute uniquely identifies the individuals that are members of the group from individuals of the general group as a unique subset. For example, a general group of "patients" may be provided in which a well defined group of "lymphoma" patients may be uniquely identifiable. Of course, more fine grained definitions of the "well defined" group may also be used such that there are various levels of groups with each group having its own associated "context", e.g., a general group of "patients" may be sub-divided into "cancer patients" and "brain injury" patients with the "cancer patients" group being further defined into smaller groups corresponding to "lymphoma," "Basal cell," "Lung Cancer," and the like.

Assuming, for example, that server 104 implements an anonymization system employing the mechanisms of the illustrative embodiments, client devices 110-114 may submit requests to the server 104 for accessing data from the server that may include personally identifiable information for individuals. Such requests may be generated automatically by analysis software or tools running on the client devices 110-114, may be generated semi-manually such as in response to a user request, via the client device 110-114, for certain information from the server 104, or the like. Any process, device, software, or tool that may generate a request for data that may contain personally identifiable information is intended to be within the spirit and scope of the illustrative embodiments. In one illustrative embodiment, it is assumed that the server 104 implements a medical information handling system to which queries for patient data may be submitted from client devices 110-114 and, as a result, portions of the data that may be returned by the server 104 may need to be anonymized as mandated by law.

Thus, the anonymization system of the illustrative embodiments, before providing the requested data to the client device 110-114, may anonymize personally identifiable information within the data that is to be returned to the client device 110-114. This may involve the elimination from, or obfuscation of, the personally identifiable information in the data that is returned to the client device 110-114. This anonymization is augmented by the mechanisms of the illustrative embodiments to provide context sensitive anonymization rather than only the general anonymization available from known systems that use basic predetermined pattern matching, keyword, and field type based anonymization without any regard for any specific relational context between individuals (persons).

Figure 3:
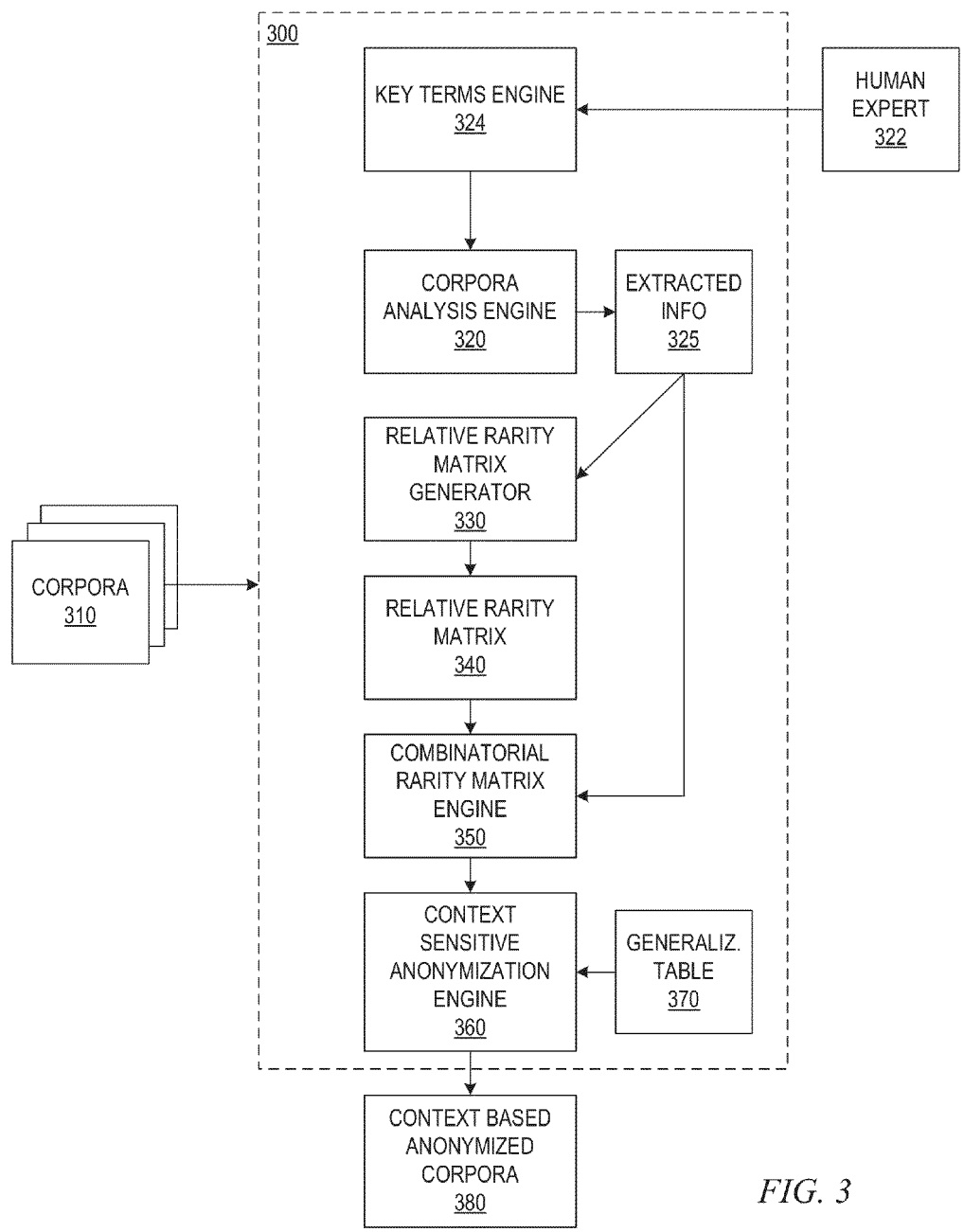
FIG. 3 is an example block diagram of the primary operational elements of a relational context anonymization system according to one illustrative embodiment.

FIG. 3 is an example block diagram of the primary operational elements of a relational context anonymization system according to one illustrative embodiment. The anonymization system set forth in FIG. 3 may be a separate system or integrated with other analysis and information handling systems for providing anonymization of data returned to requesting client devices. Thus, the input to the anonymization system of FIG. 3 is a set of documents, data structures, or the like, referred to as corpora 310, that comprise non-anonymized data which includes personally identifiable information, e.g., medical records, employment records, electronic financial documents, government collected data records for individuals, or any other non-anonymized data. Through the operation of the illustrative embodiments, context based anonymized corpora 380 is generated as an output that has rare combinations of terms, as determined from within the context of the corpora, that are personally identifiable within the context of the corpora, identified and anonymized while maintaining the context of the rare terminology but eliminating the personally identifiable nature of the original corpora 310.

The elements shown in FIG. 3 may be implemented in hardware, software executed on hardware, or any combination of hardware and software. In one illustrative embodiment, certain ones of the elements of FIG. 3 are implemented as software instructions loaded into one or more memories and executed by one or more processors of one or more data processing systems. Likewise, data structures and the like, shown in FIG. 3 may be stored in one or more memories, long term storage devices or systems, such a hard drive storage devices/systems, magnetic tape storage devices/systems, solid state storage devices/systems, and the like. In other illustrative embodiments, one or more of the elements shown in FIG. 3 may be implemented as hardware circuitry such as, for example, Application Specific Integrated Circuits (ASICs), Field Programmable Gate Arrays (FPGAs), or other hard wired, or configurable, circuitry. Any combination of software and hardware is intended to be within the spirit and scope of the illustrative embodiments.

As shown in FIG. 3, the relational context anonymization system 300 receives, as input, one or more corpora 310 of electronic data or information for anonymization. The particular one or more corpora 310 may be selected from a larger set of data (not shown), such as may be made available from the Internet, one or more databases, or any other suitable collection of data from which one or more corpora 310 may be selected. Alternatively, the one or more corpora 310 may comprise all of the larger set of data.

In one illustrative embodiment, the one or more corpora 310 may be selected from a larger set of data in response to a request for information from another computing device/system. As one illustrative example, assume that a set of data comprises all of the medical records for a large number of patients associated with a medical organization, e.g., hospital records, health insurance company records, governmental organization records, such as the Centers for Disease Control (CDC), or the like. A user of a client computing device may request information about one or more of the patients resulting in the client computing device submitting a request to the system in which the relational context anonymization system 300 is implemented, or with which it is associated, and the mechanisms of the illustrative embodiments may operate to anonymize the results data returned in response to the request from the client computing device. For example, the one or more corpora 310 may correspond to a subset of the medical records, e.g., medical records for cancer patients, medical records for lung cancer patients, etc. The one or more corpora 310 may then be analyzed according to the operation of the illustrative embodiments to determine portions of the one or more corpora 310 to be anonymized and then perform the anonymization. Thus, rather than returning sensitive personally identifiable information to the user of the client computing device, anonymized data may be returned based on an context based anonymized corpora 380.

The corpus analysis engine 320 analyzes the one or more corpora 310 to identify key terms, phrases, related terms, and the like within the one or more corpora 310 and maintains information regarding the numbers of occurrences of these key terms, phrases, etc., within the one or more corpora 310. Thus, the one or more corpora 310, which may be selected from a larger set of data based on one or more criteria, such as may be specified in a request or the like, e.g., all medical records in the domain/context of "oncology," are ingested by the corpus analysis engine 320 and analysis, such as natural language processing (NLP), is performed to identify the key terms, phrases, related terms, and the like in the one or more corpora 310. In one illustrative embodiment, a dictionary or term listing data structure 324 specifying known important terms, related terms, and the like, may be used as a basis for analyzing the one or more corpora 310 and identify the occurrences of these known important terms and related terms within the one or more corpora 310. The key terms/phrases dictionary or data structure 324 may be generated, at least partially, by input from human experts 322 in the particular field of the one or more corpora 310, e.g., medical experts in a particular medical field, e.g., oncology. That is, the dictionary or term listing data structure 324 may be specific to the particular relational context such that there may be multiple dictionaries/term listing data structures 324 for different relational context. In the alternative, a single large dictionary/term listing data structure 324 may be utilized that covers a plurality of relational contexts.

Thus, for example, the dictionary or listing data structure 324 may list key terms such as certain types of mutations, e.g., EGFR mutation, Her2, etc., histology types, e.g., squamous cell, adenocarcinoma, etc. The dictionary or listing data structure 324 may comprise a plurality of dictionaries or listing data structures for various categories of information types. For example, the dictionaries or listing data structures may comprise a physician's desk reference, listings of medical procedures, drug names, drug types, listings of types of diseases, and the like.

The information extracted by the corpus analysis engine 320 during such analysis may be stored in an extracted information data storage system 325. The information stored in the extracted information data storage system 325 may comprise, for example, entries for the important terms and the number of occurrences of each of these within the one or more corpora 310. Thus, for example, the extracted information data storage system 325 may have a first entry for an important term such as "cancer" with a corresponding number of occurrences of the term being 1000 and a second entry for another term of "EGFR mutation" having a corresponding number of occurrences of 6. Thus, the first entry has a relatively large number of occurrences and the second entry has a relative small number of occurrences.

The extracted information in the extracted information data storage system 325 may be analyzed by the relative rarity matrix generator 330 to generate a relative rarity matrix that has entries specifying important terms/phrases and their corresponding relative rarity measures. In one illustrative embodiment, the generation of the relative rarity matrix may utilize a learning model that implements a statistical linear regression algorithm that builds upon a set of relative terms and their occurrence in the one or more corpora 310.

The relative rarity measures may take many different forms. In one illustrative embodiment, the relative rarity measure may be a ratio generated based on the number of occurrences for terms in the extracted information data storage system 325. For example, a ratio of the number of occurrences of a term to a total number of occurrences of all terms in the extracted information data storage system 325 may be utilized. This gives a measure of which terms are rarer than others within the terms/phrases in the extracted information data storage system 325. The relative rarity measures may be associated with the entries for each of their corresponding terms to thereby generate the relative rarity matrix 340.

In generating the relative rarity matrix, the relative rarity matrix generator 330 may, based on the numbers of occurrences of the various terms, identify the rarest occurring terms and the most frequently occurring terms within the one or more corpora 310. The measure of "rarest" and "most frequently occurring" is based on one or more pre-determined thresholds. For example, a relative rarity measure of the number of occurrences may be a ratio of the number of occurrences of a term within the corpora relative to a total number of occurrences of important terms within the corpora. The most frequently occurring terms may be terms that have a relative rarity ratio above a predetermined threshold. The rarest terms may be likewise identified by identifying terms having a relative rarity ratio that is below another predetermined threshold. Other ways of identifying the rarest and most frequently occurring terms may be more simple or more complex, e.g., selecting the top 5 terms having the highest number of occurrences or selecting the bottom 5 terms having the lowest number of occurrences. In another illustrative embodiment, an average number of occurrences of the most frequently occurring terms is calculated and if another term has a number of occurrences less than a threshold amount, e.g., 10%, of the average, then the term is determined to be rare. Any mechanism or logic for determining the "rarest" and "most frequently occurring" terms may be used without departing from the spirit and scope of the illustrative embodiments.

The relative rarity matrix 340 and the identification of the rarest terms in the relative rarity matrix 340 is input to the combinatorial rarity matrix engine 350 which generates the combinatorial rarity matrix 355 based on the relative rarity matrix 340. The combinatorial rarity matrix engine 350 identifies the related terms (i.e. combinations of terms and their relationships) in the one or more corpora 310 that comprise the rare terms or have a close association with a rare term. For example, if the rare term is "exon 20 insertion", through analysis of the one or more corpora 310, it may be determined that when "exon 20 insertion" is found in the one or more corpora 310, the following terms are also often found: histology=squamous cell, metastasis scope=disseminated, "EGFR mutation exon 20 insertion," etc. For each of the rare terms, and related rare terms, the rare term/related rare term is validated that it meets a minimum number of occurrences. That is, there may be a threshold established to indicate a minimum number of occurrences for a term to be considered for anonymization. If a term exists less than this minimum number of occurrences, it may be an anomaly or outlier for purposes of identifying a rarity function, as described hereafter, and thus is removed from consideration. In another illustrative embodiment, for a rare term group in the combinatorial rarity matrix, a probability model may be used to determine how probable it is that the group of terms would be personally identifiable of an individual. In such an embodiment, the ratio of the occurrence of the term to the occurrence of other terms of the corpora analyzed may be calculated. The ratio may be mapped into a user defined mapping table. For example, an existence of the term ratio being 5% may map to a 90% probability of the rarity term group being likely personally identifiable.

In addition, for each of the rare terms/related rare terms, a validation that the rare term/related rare term is among a critical group for that domain/context may be performed. The critical group is a group of terms or semantic relations which are specified a priori by domain experts, i.e. human experts, for that relational context or domain. The critical group may include terms such as cancer stage, creatinine value for terms, or a semantic relation like [mass, indicates, metastasis] in the oncology context. A semantic relation is a group of terms that either have an explicitly indicated relationship or an implied relationship.

For each of the rare terms/combination of related rare terms (hereafter collectively referred to as "rare terms"), a rarity weight is assigned to the rare term. The rarity weight may be assigned manually or automatically, or a combination of automatic and manual rarity weight assignment. For example, the rarity weight may be automatically assigned and may be manually overridden should a human expert believe that a different rarity weight should be assigned. In one illustrative embodiment, the rarity weight may be assigned based on a ratio of the rare term's number of occurrences to the total number of occurrences for the rare term and its related rare terms. This gives a relative rarity of the rare term within the group comprised of the rare terms and its related rare terms. The information for each of the rare terms/related rare terms may be stored in the combinatorial rarity matrix 355, including the rarity weights assigned to these rare terms/related rare terms.

The information on the combinatorial rarity matrix 355, including the rarity weights of the rare terms (and related rare terms), are plotted by the combinatorial rarity matrix engine 350 on a linear regression graph in relation to the number of occurrences and a rarity function is determined that would map the common terms below the graph and the rarer terms above the graph (or vice versa depending on which values are plotted on the particular axes of the graph). The higher the rarity weight the more likely the term/semantic relation will be placed in parts of the combinatorial rarity matrix. This is in direct correlation to the occurrences of the term or associated terms. Thus, the line in the graph is the best fitting function (predictor function) in the linear regression graph for that data, i.e. the best fitting function is a linear regression function that best fits the data.

Figure 4A:
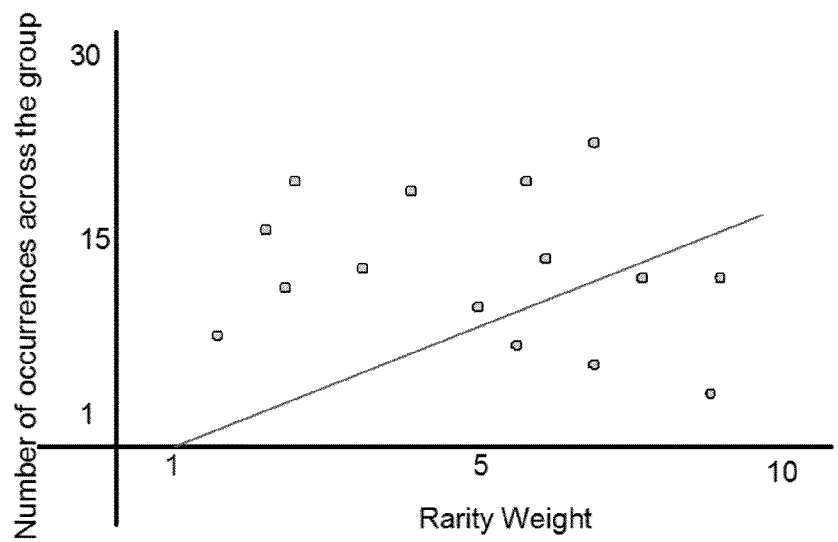
FIGS. 4A-4C are example diagrams illustrating plots of rarity weight and number of occurrences of terms within a context in accordance with one illustrative embodiment.
Figure 4B:
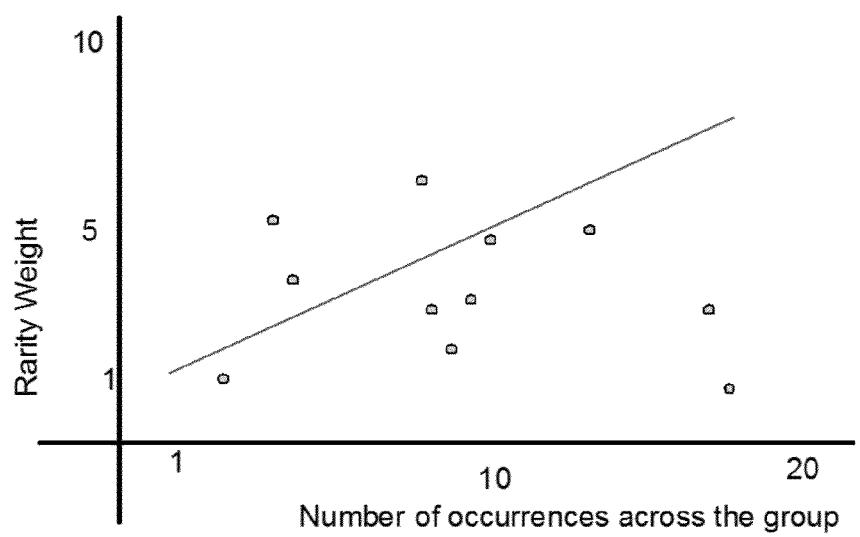
Figure 4C:
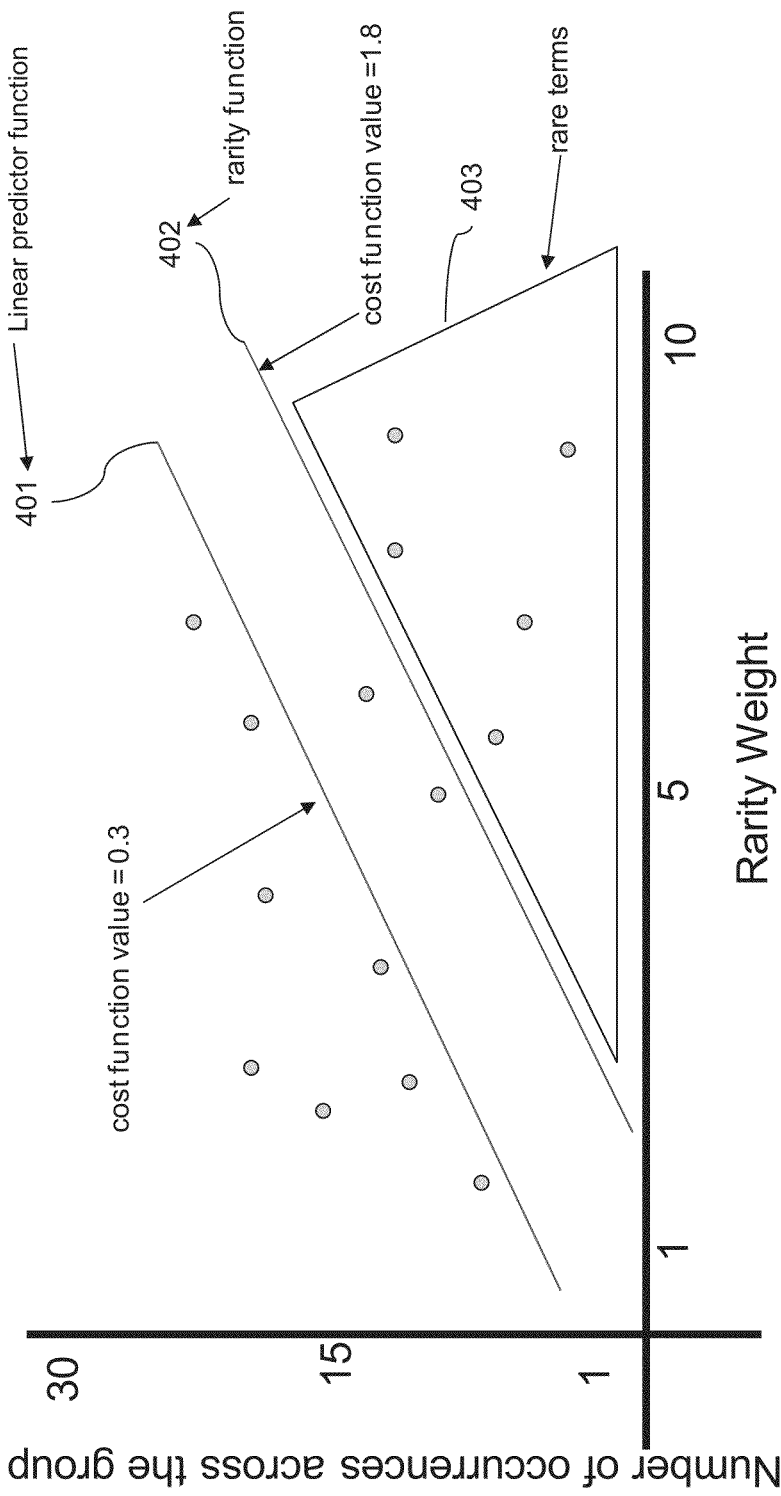

FIGS. 4A-4C illustrate examples of a linear regression graph that may be generated by the combinatorial rarity matrix engine 350 in accordance with illustrative embodiments of the present invention. FIG. 4A illustrates a linear regression graph in which the rarity weight is plotted along an x-axis and the number of occurrences across the group is plotted along the y-axis. FIG. 4B illustrates a linear regression graph in which the number of occurrences across the group is plotted along the x-axis and the rarity weight is plotted along the y-axis. FIG. 4C illustrates further details of the plot shown in FIG. 4A. In FIG. 4A the rare items are above the best fitting function line (rarity function), if the line were so that it crosses the y-axis or x-axis. In FIG. 4B the, the rarest items are below the best fitting function line (rarity function), i.e. towards the higher rarity value.

To determine the rarity function, a linear function, referred to as the predictor function, is generated that best fits the data on the linear regression graph for the most common occurring terms within the "rare terms" with a specified maximum cost function set reasonably small. That is, a linear regression machine learning process is applied by the combinatorial rarity matrix engine 350 to the data set corresponding to the the relative rarity matrix 340 using known linear regression algorithms. This generates a linear regression graph upon which linear predictor function generation operations are performed by the combinatorial rarity matrix engine 350 to generate a linear predictor function that best fits the data, i.e. a linear function (linear combination) of a set of coefficients and explanatory variables (independent variables), whose value is used to predict the outcome of a dependent variable. These known techniques are described, for example, at the Wikipedia website under the subject headings of "linear regression" and "linear predictor function."

This linear regression and predictor function generation results in a linear predictor function 401 whose line best fits the most common data set. Based on the linear predictor function 401, a cost function is evaluated for data points along the linear predictor function 401 line to determine a cost associated with the linear predictor function 401. The cost function is basically a measure of how well the linear predictor function 401 fits the true data set. The particular cost function used may be determined manually by a human being or automatically by an automated mechanism, such as logic provided in the machine learning algorithms of the combinatorial rarity matrix engine 350, for example. The use of cost functions with machine learning is generally known in the art, but more information about cost functions and their use may be found in the article "Machine Learning: Working out the Cost Function," available at the website "fnenu's Notes on Online Courses," and published Oct. 11, 2011, which is hereby incorporated by reference.

Once the cost function is determined, the goal is to minimize the cost function value for the linear predictor function 401. That is, the higher the cost function value, the worse the linear predictor function 401 fits the true data set and the lower the cost function value, the better the linear predictor function 401 fits the true data set. The linear predictor function 401 may be shifted to minimize this cost function value. Thus, the linear predictor function 401 may be manipulated to minimize the cost function value for the linear predictor function 401. With the mechanisms of the illustrative embodiments, the linear predictor function 401 is adjusted by the combinatorial rarity matrix engine 350 based on the cost function and the true data set such that the rarer terms in the true data set are closer to the linear predictor function 401 and outside the linear predictor function 401, e.g., below the linear predictor function 401. This results in a rarity function 402 being generated where the rarity function 402 is a shifted version of the linear predictor function 401 that is closer to the rare terms and whose cost value is within the maximum cost value (compensating for the shift). The combinatorial rarity matrix engine 350 may then determine the data points falling outside the linear predictor function 401 and identify them as being the rare data points (or terms) that may be used to identify personally identifiable terms.

As an example, as shown in FIG. 4C, assume that a maximum cost function value is set to 0.5 of the best fitting function (0.5 is used here only as an example of a maximum threshold cost function value and may change depending upon the particular implementation). In the depicted example, through analysis of the linear regression graph 400 and the data points therein, a linear predictor function 401 is generated and its corresponding cost value is calculated based on a given cost function. In this case, the cost value associated with the linear predictor function 401 is 0.3 indicating that the linear predictor function 401 first the data set well since it is a relatively low cost value.

In accordance with the illustrative embodiments, in order to have the linear predictor function 401 fit the rare data points more closely, the linear predictor function 401 is shifted to be closer to the data points having a higher rarity weight. Thus, in this depicted example, the linear predictor function 401 is shifted to the right and down to generate a rarity function 402. In order to make this shift, the data points falling below the linear predictor function 401 may be used as a subset of data upon which the linear predictor function generation operation may again be performed to generate a new linear function, referred to as the rarity function 402, having a same slope as the linear predictor function 401 but shifted to be closer to the rare data points (again, each data point may represent a term, a tuple of related terms, or the like, as described previously). Alternatively, various arbitrary shiftings of the linear predictor function 401 may be made and the corresponding cost functions relative to the rare data points may be evaluated to determine which shifted linear predictor function 401 best fits the rare data points, i.e. has the minimum cost value of the shifted options.

Additional measures may be calculated for identify the best fit linear predictor function 401 for the rare terms. For example, the linear predictor function 401 may be generated as a line whose value has a cost function value of no more than 0.5 (in this case 0.3 for the linear predictor function 401). The linear predictor function 401 may be shifted by an arbitrarily determined amount, e.g., a shift of 1.5 in the cost function value in the depicted example to give a cost function value of 1.8, and thereafter, the number of rare data points (terms), their rarity weights, and number of occurrences that fall under the linear predictor function 401 are determined, i.e. in the small range 403. The number of data points (terms) above the shifted linear predictor function 401 (depicted as rarity function 402), or outside of this small range 403 is determined and the ratio of the terms within the small range to the terms outside this small range 403 is calculated and compared to a threshold to validate that the terms in the small range 403 are sufficient to determine rarity. This threshold may be arbitrarily selected, such as a ratio of 10% or less. If the evaluation is positive, indicating that the ratio is less than or equal to the threshold, then the shifting of the linear predictor function 401 is complete. Otherwise, additional shifting of the linear predictor function 401 and evaluation of its fitting the rare data points (terms) is performed until a shifted linear predictor function 401 is generated that is closer to the rare data points (terms) in the linear regression graph, which has a cost function value less than or equal to the maximum cost function value (adjusted for shifts), and has a ratio of data points (terms) within the small range under the shifted linear predictor function 401 to the data points (terms) above the shifted linear predictor function 401, that is less than or equal to the predetermined threshold value. The rarity function 402 defines the function used as a border where terms falling within the designated rarity area 403 are rare terms that may be personally identifiable within the domain/context of the one or more corpora 310. The designated rarity area 403 may be defined as having an upper bound equal to the rarity function 402 and a lower bound corresponding to the x-axis in this depicted example. Of course this may be different if different values are plotted on different axes, such as shown in FIG. 4B, for example (e.g., the rarity function 402 may serve as the lower bound and the y-axis may serve as an upper bound). Terms that fall outside the designated rarity area 403 are not rare terms and thus, do not require anonymization.

Thus, after having defined this rarity function 402 through a linear regression/linear predictor function/cost function analysis process as described above, the rarity function may be applied to extracted information from the one or more corpora 310 to determine if the terms in the extracted information are personally identifiable or not and thus, may require anonymization, i.e. those terms, tuples of related terms, etc. falling within the rarity area 403 may be identified. It should be appreciated that this rarity function 402 may be refined with subsequent executions of the above methodology, e.g., such as when additional information is added to the one or more corpora 310, or the like. Thus, subsequent iterations or executions of the methodology above may be used to update previously generated rarity function definitions.

In the illustrative embodiments, a context sensitive anonymization engine 360 may apply this rarity function 402 to the terms in the one or more corpora 310, the extracted information data storage system 325, or the like, to determine if the terms are sufficiently rare to warrant anonymization because they may be personally identifiable of an individual within the context of the one or more corpora 310. The context sensitive anonymization engine 360 may perform a context proximity replacement of the terms with either a general term that is common within the context and conveys the meaning for the term or a replacement term that is common and has the same category or ontology as the current term.

A generalization table data structure 370 is built by domain experts for rare terms based on definitions for the rare terms. The definitions may be provided from context based corpora, electronic domain specific dictionaries (such as medical dictionaries, industry or subject matter specific dictionaries, or other domain specific dictionaries), electronic thesaurus, electronic journals, ontology definition data structures, and other information sources that are within, and appropriate for, the particular domain. This generalization table data structure 370 equates terms with generalized forms of these terms. For example, the term "exon 20 deletion" may be equated with "mutation" and the term "hearing loss" may be likewise equated to "sound orientation." Thus, terms may be anonymized by replacing the terms with generalized terms that have a similar context or convey a same meaning for the term.

Moreover, the terms may be generalized based on a category that is applicable to the domain/context. An example of categories may be using a generalized node in an ontology for a term or semantic relationship, which may be found by traversing a concept map for the term, built by a domain expert, up to a generalized category for that term or semantic relation, e.g., an ontology defined by a tree or graph where the "generalized category" is an upper node while the leafs are the specific terms corresponding to the upper node. For example, the term gingivitis found in a patient record may be a leaf node that corresponds to a generalized category, or upper node, defined as "dental disease" because the leaf node falls under this generalized category node. In addition, the terms may be generalized based on a commonality of the term. For example, specific names may be generalized to more common names (e.g., Stephen Walder may be anonymized to Stephen Smith). Similarly, drug names can be anonymized to more common drug names or generic drug names, e.g., Hydrocodone may be generalized to "pain reliever narcotic" or the like.

With the established generalization table data structure 370, and the identification or rare terms in the one or more corpora 310 by the context sensitive anonymization engine 360 applying the rarity function to the terms in the one or more corpora 310, the rare terms in the one or more corpora 310 may be replaced with proximity context aware terms specified in the generalization table data structure 370. As a result, the context based anonymized corpora 380 is generated and may be used to respond to the request from the client computing device.

It is important to note that the anonymized corpora 380 maintains the context and underlying meaning for the anonymized terms for use in subsequent analysis. That is, when one looks at deep analytics, i.e. analytics directed the identification or processing of deep semantic relationships, the context of data is essential as one is aggregating and associating loosely associated content to infer results. For example, one can look at a woman's name, e.g., Mary. The name Mary on its own as a name is immaterial, however in the larger data context Mary is not only a name but it is a common woman's name. Such deep analytics may make use of the fact that Mary is a common woman's name in the analysis of the surrounding context. Thus, failure to have contextual proximity results in data degradation. However, with the mechanisms of the illustrative embodiments, anonymization provides substitutions maintaining the close contextual proximity, e.g., changing Mary to Cindy, such that the deep analytics can evaluate the data and apply appropriate processing without adversely affecting the results.

Thus, with the illustrative embodiments, data may be anonymized based on the context sensitive rarity of the terms in the data and the likelihood that these terms may be personally identifiable of an individual within the context. As a result, the likelihood that data is released to individuals or automated tools that may be used to personally identify an individual is lessened by not only applying general anonymization techniques but also applying context sensitive anonymization while maintaining the context of the terms that are anonymized and the meaning of the anonymized terms.

FIGS. 4A and 4B are example diagrams illustrating plots of rarity weight and number of occurrences of terms within a context in accordance with one illustrative embodiment. The plots shown in FIGS. 4A and 4B may be generated by the context sensitive anonymization engine 360, for example, when determining a rarity function to be used for context based anonymization of the one or more corpora 310. As shown in FIGS. 4A and 4B, the rarity weights of terms are plotted against the number of occurrences for that term, with these values being on either the x or y axis, and a linear function 410, 420 is defined that fits the plotted data. This linear function is the common term function referred to above which is the basis for the definition of the rarity function.

Figure 5:
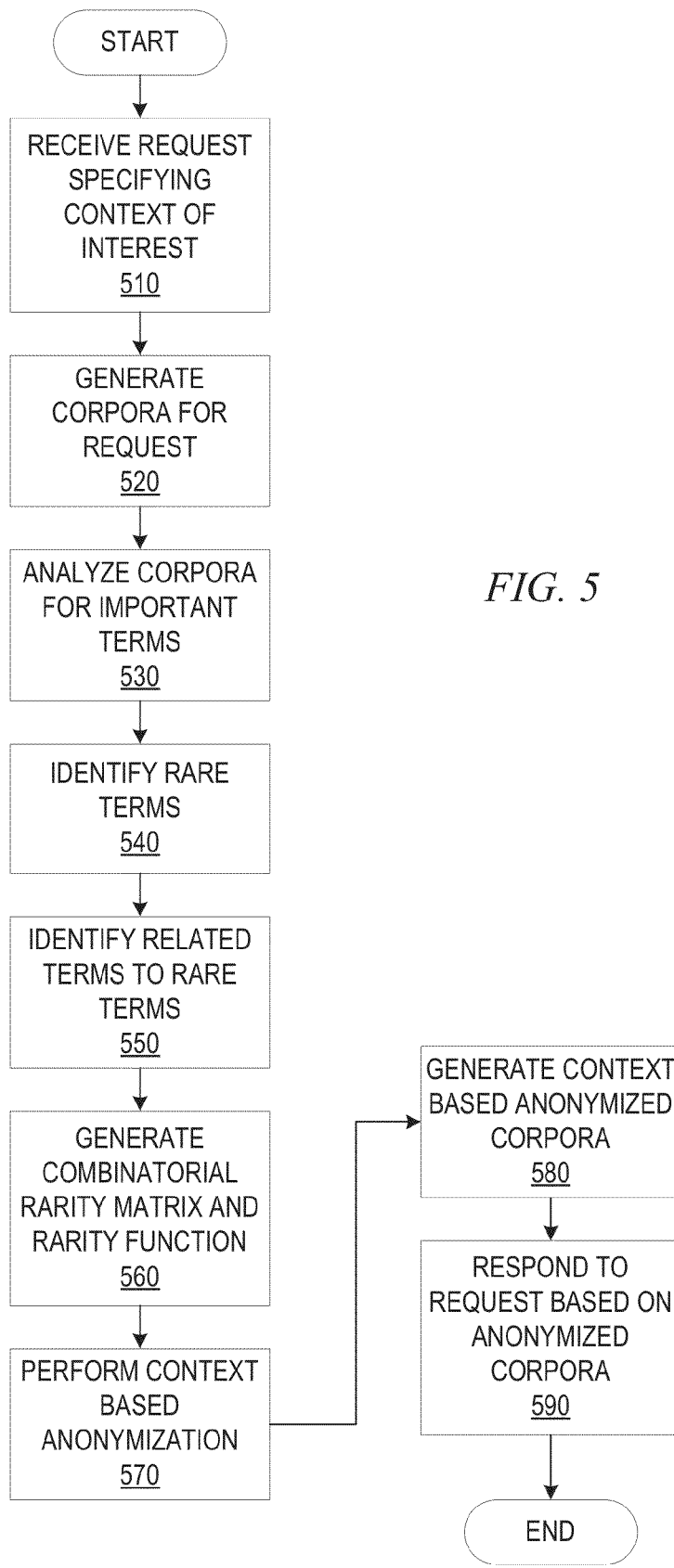
FIG. 5 is a flowchart outlining an operation for anonymizing data to be returned to a requesting computing device in accordance with one illustrative embodiment.

FIG. 5 is a flowchart outlining an operation for anonymizing data to be returned to a requesting computing device in accordance with one illustrative embodiment. The operation outlined in FIG. 5 may be implemented by the relational context anonymization system 300 of FIG. 3, for example.

As shown in FIG. 5, the operation starts by receiving a request for information (step 510). The request preferably defines the context/domain of the corpora upon which the request operates so that the corpora may be generated from a larger set of data (step 520). The corpora for the request is analyzed to identify important terms, the number of occurrences of the important terms within the corpora, and other metrics regarding the use or presence of the terms within the corpora (step 530). As noted above, this operation may make use of a listing of known key terms and may involve performing a search of the data in the corpora to identify these key terms. The results of this operation is a data structure storing the information extracted from the corpora regarding the key terms found within the corpora.

The results of the analysis of the corpora is used to identify rare terms within the corpora (step 540). A process such as that previous described above with regard to FIG. 3 may be used to differentiate rare terms from non-rare terms in the extracted information. The identified rare terms are then used to search the corpora for related terms, i.e. terms that encompass the rare terms, terms that often appear in close proximity to the rare term or in association with the rare terms, etc. (step 550). Based on the rare terms and the related terms, a combinatorial rarity matrix and rarity function are generated (step 560). The combinatorial rarity matrix stores entries for each of the rare terms and their related terms along with a rarity weight assigned to these terms/related terms. This information is used to generate the rarity function by correlating the rarity weight with a number of occurrences of the rare term/related term and determining a linear function that represents these correlations, for example.

Based on the identified rarity function, the corpora may be again analyzed to identify terms falling within the bounds of the rarity function and then anonymizing those terms (step 570). This anonymization may make use of a generalization table that is built up based on the identification of rare terms within the corpora, as previously described. The result of the anonymizaton is a context based anonymized corpora (step 580) which may be used to respond to the original request that was received (step 590). Such response may require additional analysis being performed on the anonymized corpora, but such analysis will still retain the context and meaning of the anonmyized terms by virtue of the particular context sensitive anonymization that is performed. The operation then terminates.

It should be appreciated that the context based anonymized corpora generated by the operation of the illustrative embodiments may in fact be stored for later use in responding to similar requests directed to a similar corpora. The operations described above may in fact be run on an already generalized corpora to identify additional areas for anonymization during subsequent executions of the operation. In such a case, rarity weights may be adjusted during each execution based on the then state of the corpora that is ingested. In some illustrative embodiments, the operation for generating the context based anonymized corpora is perform periodically and requests directed to the corpora between these periodic operations may be serviced using the then current anonymized corpora rather than the original corpora in which personally identifiable information is present.

Figure 6:
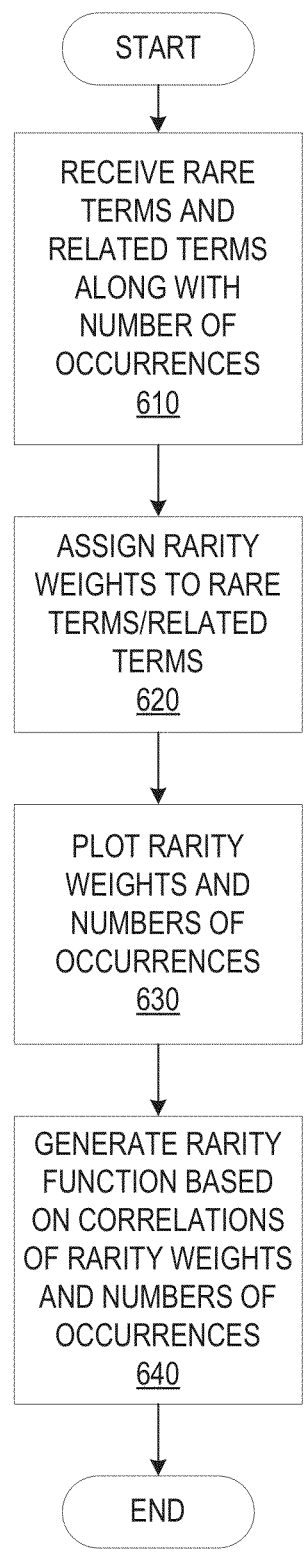
FIG. 6 is a flowchart outlining an operation for generating a combinatorial rarity matrix and rarity function in accordance with one illustrative embodiment.

FIG. 6 is a flowchart outlining an operation for generating a combinatorial rarity matrix and rarity function in accordance with one illustrative embodiment. As shown in FIG. 6 the operation starts by receiving the rare terms and the related terms for the rare terms as identified by the relative rarity matrix generator 330, for example, along with the related numbers of occurrences of these terms/related terms (step 610). A rarity weight is assigned to each of the rare terms and their related terms (step 620). The rarity weights of the various terms/related terms are plotted in correlation with their corresponding number of occurrences within the corpora (step 630). A rarity function is then identified that maps the more common terms in the rare terms/related terms above the graph with the rarer terms/related terms that are below the graph (step 640). The operation then terminates.

Figure 7:
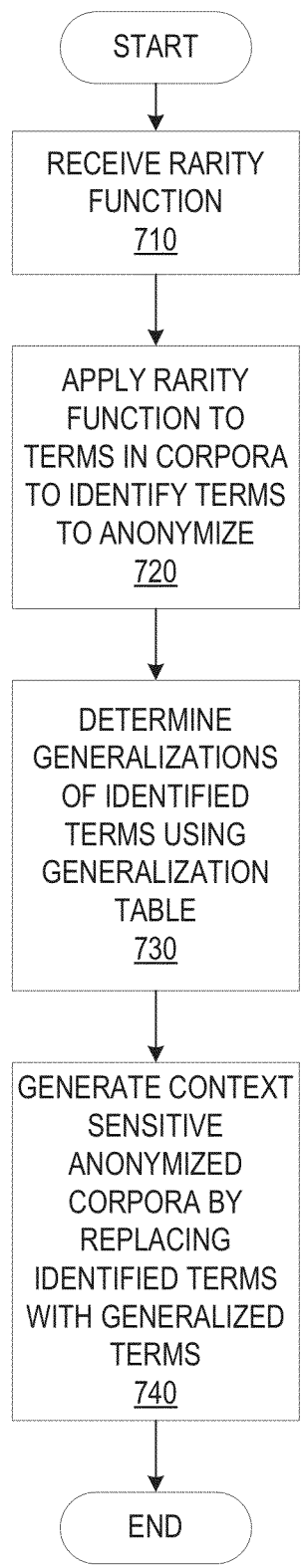
FIG. 7 is a flowchart outlining an operation for anonymizing a corpora of information based on a combinatorial rarity matrix in accordance with one illustrative embodiment.

FIG. 7 is a flowchart outlining an operation for anonymizing a corpora of information based on a combinatorial rarity matrix in accordance with one illustrative embodiment. As shown in FIG. 7, the operation starts by receiving a rarity function generated by a combinatorial rarity matrix engine 350 in FIG. 3, for example (step 710). The rarity function is applied to terms in the corpora to identify the terms that are considered to be sufficiently rare as to warrant anonymization (step 720). The identified rare terms are looked up in a generalization table data structure to identify generalized equivalents to the identified rare terms (step 730). As described above, this generalization table data structure may be built up for the identified rare terms based on definitions of these terms specified in one or more sources, e.g., medical dictionaries, industry dictionaries, data structures mapping equivalent terms, etc. The rare terms are replaced with the generalized equivalents to generate context sensitive anonymized corpora (step 740). As previously described, this replacement may be done on various levels including context and meaning based replacement, category based replacement, commonality based replacement, or the like. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for relational context sensitive anonymization of data, comprising:
   receiving, by the data processing system, a request for data, wherein the request specifies a relational context corresponding to a selected group of selected persons selected from a global group of persons based on the relational context, and wherein the relational context specifies one or more attributes of selected persons in the selected group that establishes a relationship between the selected persons and distinguishes the selected persons from non-selected persons in the global group that are not in the selected group;
   determining, by the data processing system, for the relational context corresponding to the selected group, based on a corpus of personal information data corresponding to the selected persons in the selected group, one or more key attributes in the personal information data;
   determining, by the data processing system, a rarity value for each key attribute of the one or more key attributes within the relational context of the selected group; and
   anonymizing, by the data processing system, selected key attributes in the one or more key attributes based on the determined rarity value for each of the key attributes within the relational context of the selected group, wherein determining the rarity value of each key attribute of the one or more key attributes comprises generating a relative rarity matrix data structure that identifies the one or more key attributes and their corresponding related relative rarity measures.

2. The method of claim 1, wherein determining a rarity of each key attribute of the one or more key attributes comprises generating a combinatorial rarity matrix using combinatorial matrix theory operations.

3. The method of claim 1, wherein the one or more key attributes are textual terms.

4. The method of claim 3, wherein determining the one or more key attributes in the personal information data comprises determining deep semantic relationships between textual terms in the personal information data and identifying uncommon deep semantic relationships between textual terms in the personal information data.

5. The method of claim 3, wherein determining, for the relational context corresponding to the selected group, based on personal information data corresponding to the selected persons in the selected group, one or more key attributes in the personal information data, comprises:
   identifying one or more key terms based on a terms listing data structure specific to the relational context;
   determining a relative rarity measure for each key term in the one or more key terms based on a relative number of occurrences of the key term within the corpus of personal information data; and
   generating the relative rarity matrix data structure based on the relative rarity measures of the one or more key terms.

6. The method of claim 5, further comprising:
   generating a combinatorial rarity matrix based on the relative rarity matrix, wherein the combinatorial rarity matrix identifies combinations of rare key terms in the one or more key terms and a probability measure of each combination of rare key terms occurring.

7. The method of claim 6, further comprising:
   determining a rarity function based on the combinatorial rarity matrix, wherein the rarity function defines a border between rare combinations of terms and common combinations of terms within the relational context; and
   selecting the selected key attributes for anonymization based on the rarity function.

8. The method of claim 7, wherein determining a rarity function comprises:
  performing a linear regression operation on the combinatorial rarity matrix to generate a linear regression graph in which data points correspond to terms or combinations of terms in the combinatorial rarity matrix;
  generating a linear predictor function based on the linear regression graph and a cost function; and
  shifting the linear predictor function to better fit data points having a higher rarity weight in the linear regression graph while maintaining a cost value of the cost function equal to or below a maximum cost value, to thereby generate the rarity function.

9. The method of claim 1, wherein anonymizing selected key attributes in the one or more key attributes based on the determined rarity value for each of the key attributes within the relational context of the selected group comprises replacing the selected key attributes with generalized attributes specified in a generalization table data structure.

10. The method of claim 1, wherein the data processing system is a medical information handling system.

11. A computer program product comprising a non-transitory computer readable medium having a computer readable program stored therein, wherein the computer readable program, when executed on a computing device, causes the computing device to:
  receive a request for data, wherein the request specifies a relational context corresponding to a selected group of selected persons selected from a global group of persons based on the relational context, and wherein the relational context specifies one or more attributes of selected persons in the selected group that establishes a relationship between the selected persons and distinguishes the selected persons from non-selected persons in the global group that are not in the selected group;
  determine, for the relational context corresponding to the selected group, based on a corpus of personal information data corresponding to the selected persons in the selected group, one or more key attributes in the personal information data;
  determine a rarity value for each key attribute of the one or more key attributes within the relational context of the selected group; and
  anonymize selected key attributes in the one or more key attributes based on the determined rarity value for each of the key attributes within the relational context of the selected group, wherein the computer readable program causes the computing device to determine the rarity value of each key attribute of the one or more key attributes at least by generating a relative rarity matrix data structure that identifies the one or more key attributes and their corresponding related relative rarity measures.

12. The computer program product of claim 11, wherein determining a rarity of each key attribute of the one or more key attributes comprises generating a combinatorial rarity matrix using combinatorial matrix theory operations.

13. The computer program product of claim 11, wherein the one or more key attributes are textual terms.

14. The computer program product of claim 13, wherein determining the one or more key attributes in the personal information data comprises determining deep semantic relationships between textual terms in the personal information data and identifying uncommon deep semantic relationships between textual terms in the personal information data.

15. The computer program product of claim 13, wherein determining, for the relational context corresponding to the selected group, based on personal information data corresponding to the selected persons in the selected group, one or more key attributes in the personal information data, comprises:
  identifying one or more key terms based on a terms listing data structure specific to the relational context;
  determining a relative rarity measure for each key term in the one or more key terms based on a relative number of occurrences of the key term within the corpus of personal information data; and
  generating the relative rarity matrix data structure based on the relative rarity measures of the one or more key terms.

16. The computer program product of claim 15, wherein the computer readable program further causes the computing device to:
  generate a combinatorial rarity matrix based on the relative rarity matrix, wherein the combinatorial rarity matrix identifies combinations of rare key terms in the one or more key terms and a probability measure of each combination of rare key terms occurring.

17. The computer program product of claim 16, wherein the computer readable program further causes the computing device to:
  determine a rarity function based on the combinatorial rarity matrix, wherein the rarity function defines a border between rare combinations of terms and common combinations of terms within the relational context; and
  select the selected key attributes for anonymization based on the rarity function.

18. The computer program product of claim 17, wherein determining a rarity function comprises:
  performing a linear regression operation on the combinatorial rarity matrix to generate a linear regression graph in which data points correspond to terms or combinations of terms in the combinatorial rarity matrix;
  generating a linear predictor function based on the linear regression graph and a cost function; and
  shifting the linear predictor function to better fit data points having a higher rarity weight in the linear regression graph while maintaining a cost value of the cost function equal to or below a maximum cost value, to thereby generate the rarity function.

19. The computer program product of claim 11, wherein anonymizing selected key attributes in the one or more key attributes based on the determined rarity value for each of the key attributes within the relational context of the selected group comprises replacing the selected key attributes with generalized attributes specified in a generalization table data structure.

20. The computer program product of claim 11, wherein the computing device implements a medical information handling system.

21. An apparatus, comprising:
  a processor; and
  a memory coupled to the processor, wherein the memory comprises instructions which, when executed by the processor, cause the processor to:
  receive a request for data, wherein the request specifies a relational context corresponding to a selected group of selected persons selected from a global group of persons based on the relational context, and wherein the relational context specifies one or more attributes of selected persons in the selected group that establishes a relationship between the selected persons and distinguishes the selected persons from non-selected persons in the global group that are not in the selected group;

determine, for the relational context corresponding to the selected group, based on a corpus of personal information data corresponding to the selected persons in the selected group, one or more key attributes in the personal information data;

determine a rarity value for each key attribute of the one or more key attributes within the relational context of the selected group; and anonymize selected key attributes in the one or more key attributes based on the determined rarity value for each of the key attributes within the relational context of the selected group, wherein the instructions cause the processor to determine the rarity value of each key attribute of the one or more key attributes at least by generating a relative rarity matrix data structure that identifies the one or more key attributes and their corresponding related relative rarity measures.

22. The apparatus of claim 21, wherein the instructions cause the processor to determine a rarity of each key attribute of the one or more key attributes at least by generating a combinatorial rarity matrix using combinatorial matrix theory operations.

23. The apparatus of claim 21, wherein the one or more key attributes are textual terms, and wherein determining the one or more key attributes in the personal information data comprises determining deep semantic relationships between textual terms in the personal information data and identifying uncommon deep semantic relationships between textual terms in the personal information data.

24. The apparatus of claim 23, wherein the one or more key attributes are textual terms, and wherein determining, for the relational context corresponding to the selected group, based on personal information data corresponding to the selected persons in the selected group, one or more key attributes in the personal information data, comprises:

identifying one or more key terms based on a terms listing data structure specific to the relational context;

determining a relative rarity measure for each key term in the one or more key terms based on a relative number of occurrences of the key term within the corpus of personal information data;

generating the relative rarity matrix data structure based on the relative rarity measures of the one or more key terms;

generating a combinatorial rarity matrix based on the relative rarity matrix, wherein the combinatorial rarity matrix identifies combinations of rare key terms in the one or more key terms and a probability measure of each combination of rare key terms occurring;

determining a rarity function based on the combinatorial rarity matrix, wherein the rarity function defines a border between rare combinations of terms and common combinations of terms within the relational context; and selecting the selected key attributes for anonymization based on the rarity function.

25. The apparatus of claim 24, wherein the instructions cause the processor to determine a rarity function at least by:

performing a linear regression operation on the combinatorial rarity matrix to generate a linear regression graph in which data points correspond to terms or combinations of terms in the combinatorial rarity matrix;

generating a linear predictor function based on the linear regression graph and a cost function; and shifting the linear predictor function to better fit data points having a higher rarity weight in the linear regression graph while maintaining a cost value of the cost function equal to or below a maximum cost value, to thereby generate the rarity function.

\* \* \* \* \*